June 10, 1941.  E. C. GOODALE  2,244,945
DEVICE FOR GRAPHICALLY SOLVING COMPLEX QUANTITIES
Filed July 12, 1939  3 Sheets-Sheet 1

INVENTOR.
Edgar C. Goodale
BY Fred G. Matheny
ATTORNEY

INVENTOR.
Edgar C. Goodale
BY Fred C. Matheny
ATTORNEY

June 10, 1941.　　　　E. C. GOODALE　　　　2,244,945
DEVICE FOR GRAPHICALLY SOLVING COMPLEX QUANTITIES
Filed July 12, 1939　　　3 Sheets-Sheet 3

INVENTOR.
Edgar C. Goodale
BY
Fred C. Matheny
ATTORNEYS

Patented June 10, 1941

2,244,945

UNITED STATES PATENT OFFICE 2,244,945

DEVICE FOR GRAPHICALLY SOLVING COMPLEX QUANTITIES

Edgar C. Goodale, Olympia, Wash.

Application July 12, 1939, Serial No. 283,941

8 Claims. (Cl. 33—75)

This invention relates to a device for graphically multiplying and dividing complex mathematical quantities.

An object of this invention is to provide a device of this nature which will eliminate a great amount of labor and save much time in the solution of mathematical problems involving, so called, complex quantities.

Another object of this invention is to provide a device for graphically multiplying and dividing complex quantities comprising a plane surface having a system of rectangular cartesian coordinates marked thereon about a point of origin and having a transparent work sheet pivoted at the point of origin and angularly movable over the marked system of coordinates, said work sheet providing visibility therethrough of the system of coordinates and having a surface whereon marks may be made.

Another object of the invention is to provide a device for graphically multiplying and dividing complex quantities comprising a plane surface having a system of rectangular cartesian coordinates marked thereon about a point of origin and having angular graduations marked thereon, and a transparent work sheet pivoted at the point of origin and angularly movable over the marked system of coordinates, said work sheet affording therethrough visibility of the system of coordinates and being capable of having marks made thereon, and a marker member pivoted at the said point of origin and angularly movable relative to both said plane surface and said work sheet and providing a straight radial marker line.

In the accompanying drawings Fig. 1 is a detached plan view of the base portion of this device showing a plane flat surface member having a system of rectangular cartesian coordinates plotted or depicted thereon.

Like reference numerals designate like parts throughout the several views.

Figure 1:
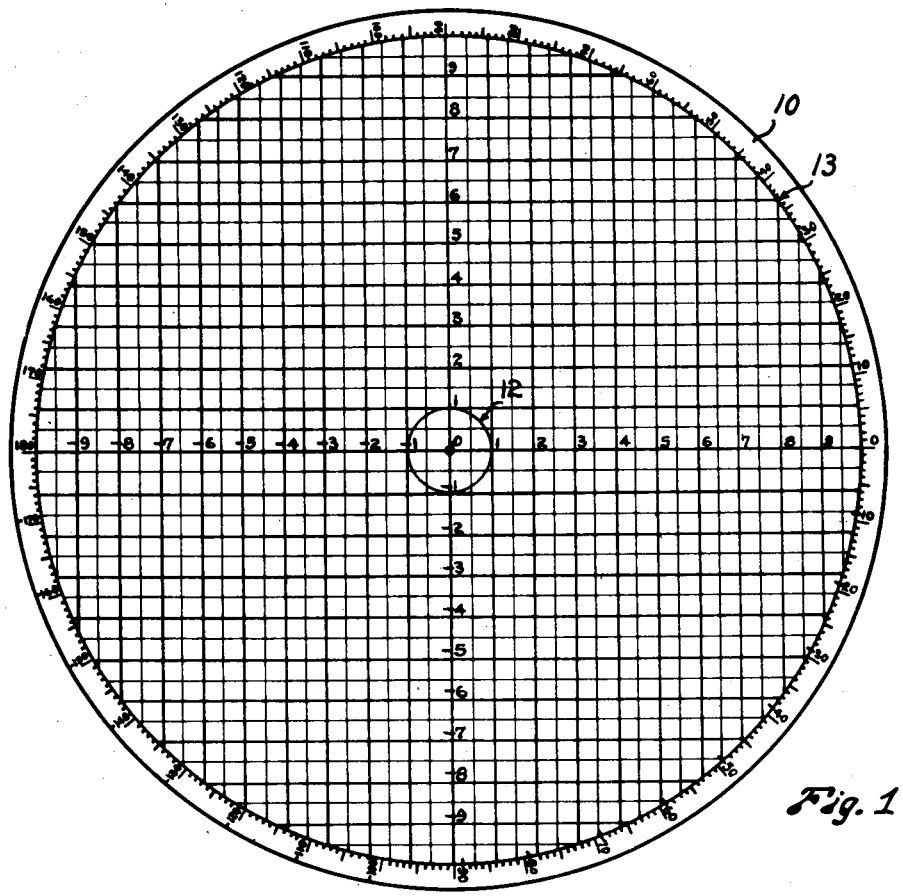

Referring to the drawings, 10 designates a base member, preferably of circular shape and non-flexible material and provided with a plane flat top surface having a system of rectangular cartesian coordinates plotted or depicted thereon by suitable intersecting vertical and horizontal lines. This system of rectangular cartesian coordinates has a point of origin O, and a pivot member 11 is provided at this point of origin. Points to the right of the point of origin are to be regarded as "positive, real" to the left "negative real," above "positive unreal" and below "negative unreal." Preferably the base member 10 is circular and the peripheral portion thereof is marked with angular graduations such as degrees starting from a zero point this marking is clockwise through $+90°$ to $180°$ and starting from the same $0°$ counterclockwise through $-90°$ to $180°$.

Also preferably the base lines of the system of coordinates which pass through the point of origin O are numbered from one to ten or from minus one to minus ten outwardly from the point of origin. Also a unit circle 12 having one unit as a radius, is described around the point of origin and a ten circle 13 having ten units as a radius is described around the peripheral portion of the base member.

Figure 4:
Fig. 4 is a sectional view through the parts shown in Figs. 1, 2 and 3, showing the same in assembled relation.
Figure 3:
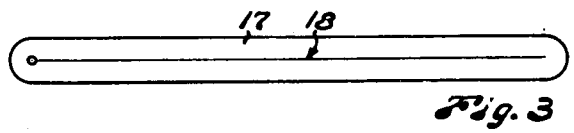
Fig. 3 is a detached plan view of an indicator member adapted to be pivotally mounted on said base member at said point of origin and having visible marking means extending in a straight line outwardly from the pivotal point thereof.
Figure 2:
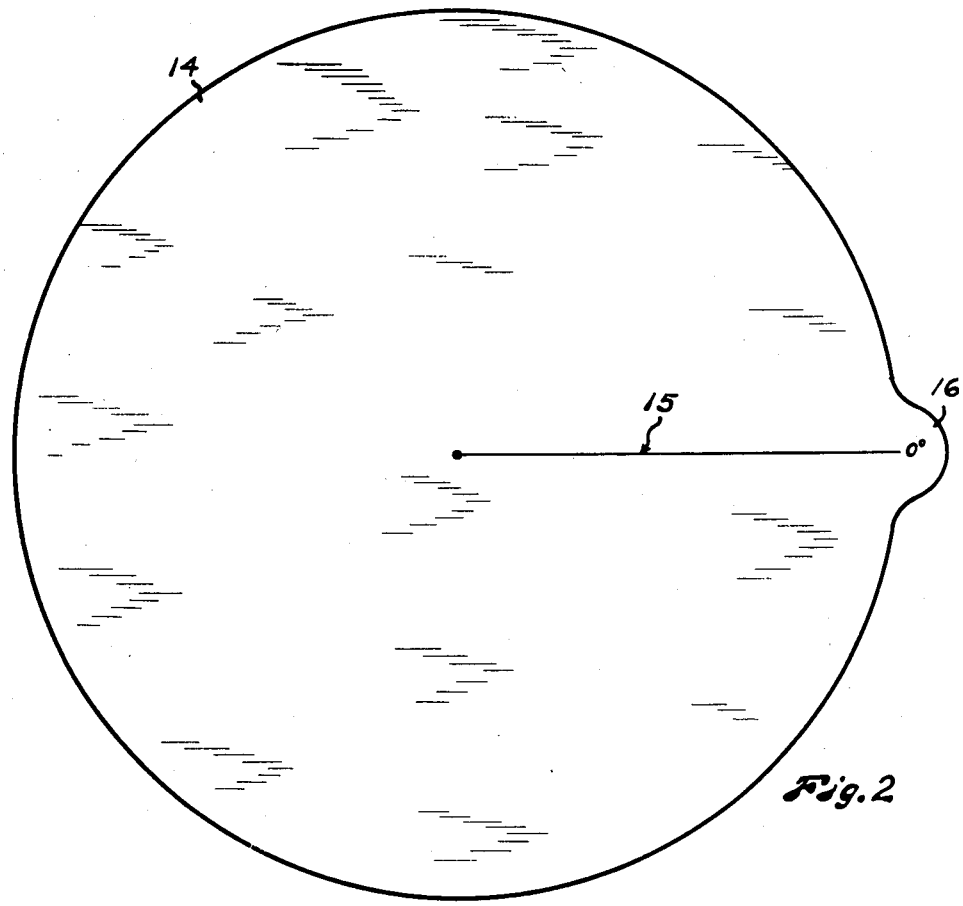
Fig. 2 is a detached plan view of a transparent work disc adapted to be mounted on the base member on a pivot located at the point of origin of the system of rectangular cartesian coordinates.

The work sheet 14, Figs. 2 and 4, is formed of transparent material through which the lines of the system of rectangular coordinates are easily seen. This work sheet is rotatably mounted on the pivot 11 for movement over the coordinates and is provided with a straight radial line 15 extending substantially from the center to the periphery thereof. The work sheet 14 is preferably substantially the same diameter as the base member 10 and is preferably provided with a marginal lobe 16 which may be grasped to angularly move the work sheet 14 on the base member 10.

A thin flat blade like member 17 of transparent material is positioned between the base member 10 and work sheet 14 and mounted on the pivot 11. This blade like member 17 preferably has a straight radial line 18 and said blade like member is preferably long enough to extend beyond the peripheral portions of the base member 10 and work sheet 14 so that it may be readily grasped and angularly moved. Obviously a straight radial edge could be provided on the member 17 to function in the same manner as the radial line 18.

The device just described is used in the manner hereinafter set forth in the graphic solution of what are commonly referred to in mathematics as complex quantities.

A complex quantity, as commonly used in mathematics and as herein referred to is a quantity having two parts, one part being known as "real" and the other as "unreal." The absolute value of the quantity forms the diagonal of a right triangle and the two parts form the legs of the triangle, the "real" part being the horizontal leg and the "unreal" part the vertical leg.

Either part may be either positive or negative. A "real" part is positive when its direction is horizontally rightward and negative when its direction is horizontally leftward. An "unreal" part is positive when its direction is vertically upward and negative when its direction is vertically downward.

If the heel of the vector representing the "unreal" part is placed on the tip or toe of the vector representing the "real" part then the absolute value is always the diagonal distance from the heel of the "real" part to the toe of the "unreal" part. The "unreal" part is distinguished from the "real" part by multiplying it by the letter "j," which represents the square root of minus one.

Complex quantities are multiplied by multiplying their absolute values and adding their characteristic angles algebraically (that is, keeping track of plus and minus signs). The characteristic angle of a quantity is the angle whose tangent is $$\left(\frac{\text{unreal part}}{\text{real part}}\right)$$

Thus, if $A=5$ at angle $15°$ and $B=7$ at $10°$, then $AB=35$ at $25°$. If $B$ were $7$ at $-10°$, then $AB$ would be $35$ at angle $5°$.

Complex quantities are divided by dividing their absolute values and subtracting the characteristic angle of the divisor from that of the quantity being divided, algebraically as before.

Thus, if $A=6$ at angle $15°$ and $B=3$ at $5°$, then $$\frac{A}{B}=\frac{6}{3}=2 \text{ at } 10°$$

If $B$ were $3$ at $-5°$, then $$\frac{A}{B}$$

would be $2$ at $20°$.

In practice the adding and subtracting of absolute values has to be done geometrically and few problems are encountered in which there is not addition and subtraction interspersed with multiplication and division. Addition and subtraction of complex quantities given in terms of "real" and "unreal" components is very simple, being simply an algebraical addition or subtraction of "real" terms and another for the "unreal" terms. Thus, by keeping the quantities in terms of the "real" and "unreal" components any additions and subtractions encountered may be easily done and the multiplications and divisions may be done on my graphic device in a very simple manner, as hereafter described.

In the use of this device for multiplying and dividing complex quantities, the user secures the correct angle of the result by plotting the quantities on the transparent sheet, cascade fashion, thus automatically adding and subtracting angles as required. This multiplies and divides absolute values, plotted as "real" and "unreal" components, by arranging them as the sides of similar triangles using either unit-distance or ten-distance or any other desired distance as reference.

The parallel lines of the similar triangles are obtained by lining up the points along, or equidistant from, parallel coordinate lines.

If the use of unit reference distance would run the result off the transparent sheet, 10 is used as reference distance.

In a general way the graphical multiplication and division of complex quantities by the use of this device, is as follows:

Starting with the given base line 15 on the transparent sheet and rotating it until it coincides with a chosen base line on the coordinate system, a complex quantity is indicated on the transparent sheet by a point, the position of the point being determined with reference to the coordinate system; quantities in the numerator being laid off in agreement with their algebraical signs and with the coordinate system while those in the denominator have their "real" terms laid off in agreement with their algebraical signs while their "unreal" terms are laid off in a direction opposite to that which would agree with their algebraical signs.

The first complex quantity which was represented by a point on the transparent sheet is now used as a temporary reference line on which the second complex quantity is plotted. This is done by rotating the point representing the first complex quantity to the base line of the coordinate system and from this position laying off the second complex quantity with reference to the coordinate system. Similarly other quantities are laid off, the preceding quantity being first rotated to the coordinate system base line, and laid off with reference to it.

The drawing of parallel lines on the transparent sheet is made unnecessary by rotating it until the cross-section lines of the coordinate system lie parallel to the straight line through the points which determine the slope of the line to which a parallel line would otherwise have to be drawn for the multiplying or dividing act. Line 18 on member 17 makes it unnecessary to draw a line on the sheet 14 along the diagonal representing the absolute value.

Specific examples of the use of this device for the multiplication and division of complex quantities are as follows:

To multiply $B=2+j4$ by $A=3+j5$:

Rotate the transparent sheet 14 until the 0° reference line 15 coincides with the 0° line of the coordinate system. Lay off 3 rightward from 0 and 5 upward to determine point A, Fig. 5, the multiplier. Rotate A to the 0° line of the coordinate system and mark the ten-point, $T_a$. Lay off 2 rightward from 0 and 4 upward to determine point B, the quantity being multiplied. Rotate sheet 14 until B and $T_a$ lie along or equidistant from the same coordinate line, either vertical or horizontal. Then a parallel coordinate line through point A will intersect the line of OB at point $x(AB)$, the subscript denoting that length $0x(AB)$ is $$\frac{1}{10}$$

of the true value of AB. The line OB need not be drawn on the sheet 14, as member 17 may be angularly moved so that radial line 18 will pass through point B and point $x(AB)$ may be correctly located by reference to this line. By rotating the transparent sheet to bring the 0° line 15 thereof coincident with the 0° line of the coordinate system the "real" and "unreal" components of length $0x(AB)$ are found. Ten times these values will be the "real" and "unreal" components of AB. Also radial line 18 of member 17 may be used to facilitate the reading of angles without drawing lines on sheet 14 out to the degree graduations at the periphery of base member 10.

Figure 5:
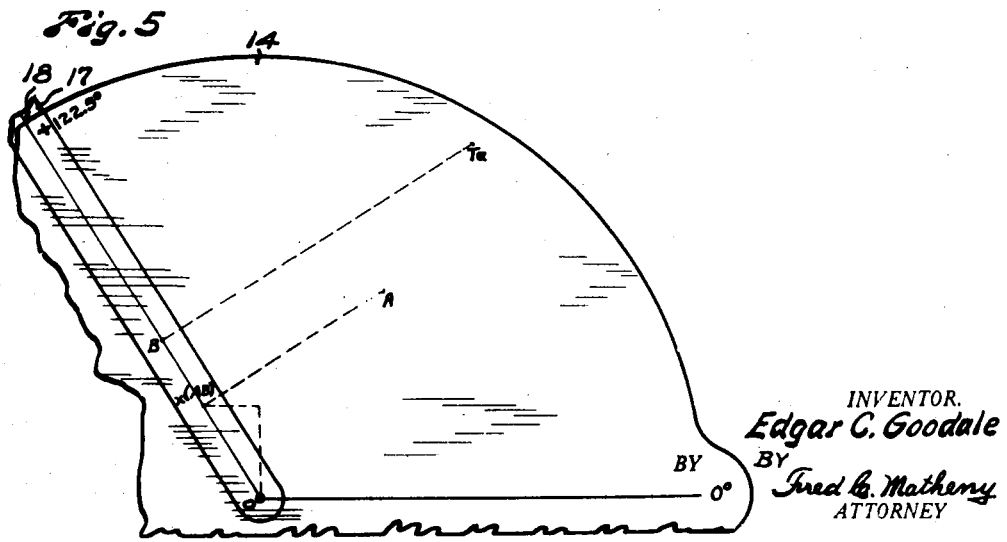
Fig. 5 is a detached fragmentary view of the work sheet illustrating a problem in multiplication worked thereon certain lines that would not need to be drawn being shown dotted.

Fig. 5 shows the markings of points on the work sheet that are used in solving the above multiplication. Certain lines that would not need to be drawn on sheet 14 are shown dotted in Fig. 5. The line OB shown in Fig. 5 is the line 18 on member 17, a portion of which member 17 is shown underneath the transparent sheet 14.

To divide the complex quantity $A=3+j5$ by $B=2+j4$:

Rotate the transparent work sheet until the 0° reference line 15 coincides with the 0° line of the coordinate system. Lay off 2 rightward from 0 and 4 downward, since it is in the denominator, to determine the point B, the divisor. Rotate B to the 0° line of the coordinate system and mark unit point $U_b$. Lay off 3 rightward from 0 to 5 upward to determine point A, the quantity being divided. Rotate sheet 14 until point B and point A lie along, or equidistant from, the same coordinate line. Then a parallel line through $U_b$ will intersect the line of 0A at point $$\frac{A}{B}$$

Rotate until the 0° line 15 of the sheet 14 coincides with 0° line of the coordinate system. Then the "real" and "unreal" parts of the quantity $$\frac{A}{B}$$

will be found. The absolute value will be represented by the diagonal of the triangle, Fig. 6, and the "real" and "unreal" parts by the horizontal and vertical legs of said triangle. The "unreal" portion shown here is very small and is negative.

Figure 6:
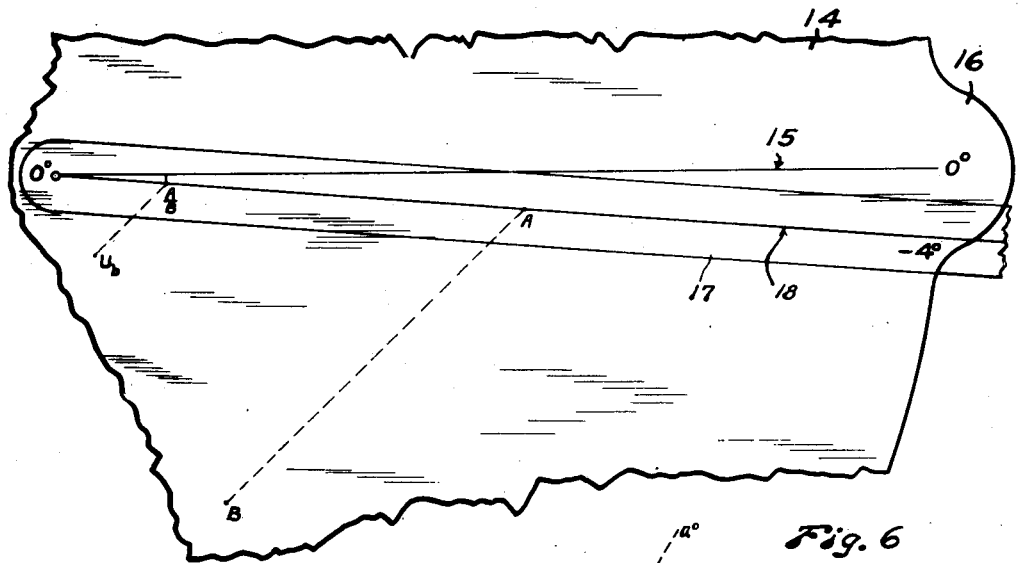
Fig. 6 is a detached fragmentary view of the work sheet illustrating a problem in division worked thereon, certain lines that would not need to be drawn on the sheet being shown dotted, Fig. 6 being on a larger scale than Fig. 5.

Fig. 6 shows the markings of points on the work sheet 14 that are used in solving the problem in division, above explained. Certain lines that would not need to be drawn on sheet 14 are shown dotted in Fig. 6, and the line 0A therein shown is the line 18 on the member 17, a portion of which member 17 is shown beneath the transparent sheet 14.

The necessity of drawing with straight edge and pencil the line OB in the multiplication problem and the line 0A in the division problem is eliminated when a rotatable member, such as member 17 with radial line 18 thereon, is incorporated as a part of this apparatus and pivoted at the point of origin of the coordinate system.

Proofs of problems in multiplication and division of complex quantities may be carried out on my graphic device as follows:

Proof of multiplication hereinbefore explained.

Figure 7:
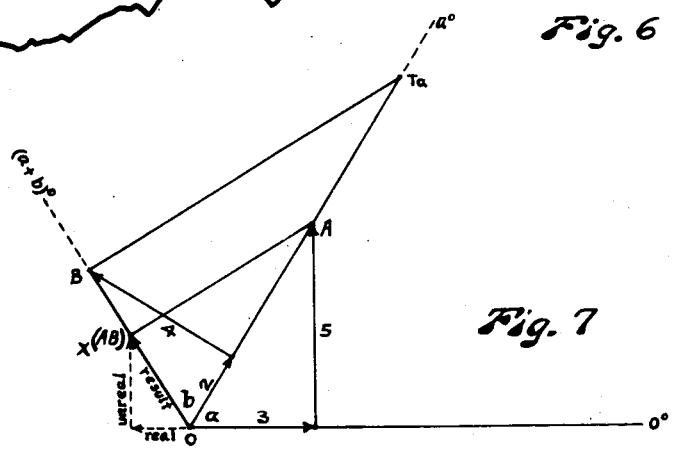
Fig. 7 is a diagram illustrating the method of operation of this graphic device in the proof of a problem in multiplication of a complex quantity.
Figure 8:
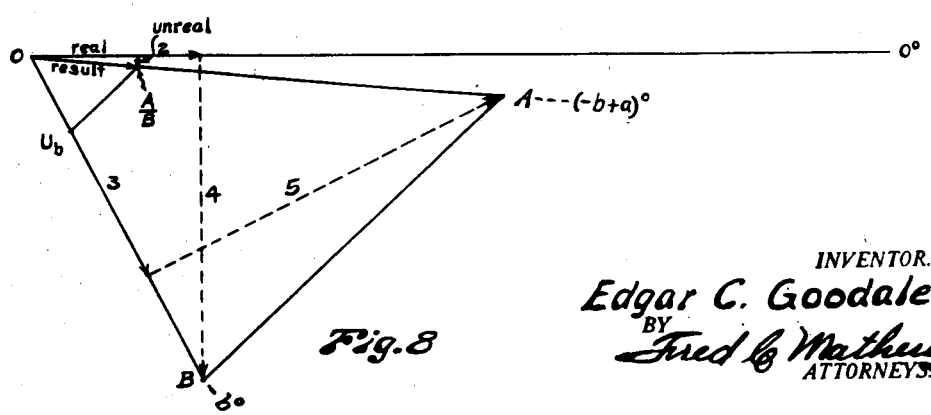
Fig. 8 is a diagram illustrating the method of operation of this graphic device in the proof of a problem in division of a complex quantity, the scale of Figs. 6 and 8 being the same.

On the transparent sheet 14 draw similar triangles, $0\text{---}A\text{---}x(AB)$ and $0\text{---}T_a\text{---}B$. It is apparent that $$\frac{\text{length } 0x(AB)}{\text{length } 0A} = \frac{\text{length } 0B}{\text{length } 0T_a}$$

see Fig. 7. Therefore, $$\text{length } 0_x(AB) = \frac{(\text{length } 0A)(\text{length } 0B)}{\text{length } 0T_a} = \frac{(\text{complex quantity } A)(\text{complex quantity } B)}{10}$$

With the 0° line of the transparent sheet 14 as a reference, point A is plotted at such a location that the angle between the 0° line and the line 0A is equal to the characteristic angle, $a$, of complex quantity A. Similarly point B is located so that the angle between line 0A and line OB is equal to the characteristic angle, $b$, of complex quantity, B. Hence point B and also point $x(AB)$ which lies along line OB will lie at an angle $(a+b)$ with respect to the 0° reference line. Therefore the length from point 0 to point $x(AB)$ represents the absolute value of the complex quantity product, AB, and its direction is correct with respect to the 0° line of the sheet 14.

If the product AB appears, by inspection, to have an absolute value between 1 and 10 then unit point, $U_a$, on line 0A would replace ten-point, $T_a$, in the solution. The result in this case would be the actual product, AB and would lie at point (AB), the length 0(AB) being the true length of the product.

In this case in similar triangles $0\text{---}A\text{---}(AB)$ and $0\text{---}U_a\text{---}B$ the following would be true:

$$\frac{\text{length } 0(AB)}{\text{length } 0A} = \frac{\text{length } 0B}{\text{length } 0U_a}$$

therefore length 0(AB) is equal to $$\frac{(\text{length } 0A) \text{ times } (\text{length } 0B)}{\text{length } 0U_a} = \frac{(\text{complex quantity } A)(\text{complex quantity } B)}{1}$$

Proof of division hereinbefore explained.

On the transparent sheet 14 draw similar triangles $0\text{---}B\text{---}A$ and $$0\text{---}U_b\text{---}\left(\frac{A}{B}\right)$$

It is apparent that $$\frac{\text{length } 0\left(\frac{A}{B}\right)}{\text{length } 0U_b} = \frac{\text{length } 0A}{\text{length } 0B}$$

therefore length $$0\left(\frac{A}{B}\right) = \frac{\text{length } 0A}{\text{length } 0B} = \frac{\text{complex quantity } A}{\text{complex quantity } B}$$

With the 0° line of the transparent sheet 14 as a reference, point B is plotted at such a location that the angle between the 0° line and the line OB is equal to "minus" the characteristic angle, $b$, of complex quantity B. With the line OB as a reference, point A is located so that the angle between line OB and line 0A is equal to the characteristic angle, $a$, of complex quantity, A. Hence line 0A, and therefore line $$0\left(\frac{A}{B}\right)$$

which lies along 0A is located at angle $(a-b)$ with respect to the 0° line of the sheet 14.

If the quotient,
$$\frac{A}{B}$$
appears by inspection to have an absolute value of less than 1, then ten-point, $T_b$, on line $OB$ would replace unit-point, $U_b$, in the solution. The result in this case would be a length
$$0^\times \left(\frac{A}{B}\right)$$
the superscript "x" denoting that its value on the diagram is ten times its true value.

In this case, in similar triangles, $O$—$B$—$A$ and
$$O - T_b - {}^\times\left(\frac{A}{B}\right)$$
the following would be true,
$$\frac{\text{length } 0^\times\left(\frac{A}{B}\right)}{\text{length } OT_b} = \frac{\text{length } OA}{\text{length } OB}$$
therefore length
$$0^\times\left(\frac{A}{B}\right) = \text{ten times } \frac{\text{length } OA}{\text{length } OB}$$
and this is equal to ten times
$$\frac{\text{complex quantity } A}{\text{complex quantity } B}$$

Another method to be followed in the use of this graphic device is as follows: Instead of plotting the coordinate system between 0 and 10 only, plot between 0 and 10 and mark the divisions in twice this scale and half this scale. Thus there will be only one set of lines and only the two circles, one at 0 and one at 10, but there will be three scales, 0 to 50, 0 to 10, and 0 to 20. Thus the 20, 10, and 5 will all lie on the ten circle. The advantage of this is that when the products get too near 10 in value they can be shifted to either the 20 or the 5 scale. Similarly this can be done when they lie too near the 1 in value. Thus it is possible to carry on most of the work in the upper range where the accuracy is greater. It is very simple to take care of the shifting of scales and in many cases the scale factors will cancel each other out so that there is no difference in the result, except the attainment of greater accuracy, than there would be if one scale had been used.

The foregoing description and accompanying drawings clearly disclose what I now regard as a preferred embodiment of my invention but it will be understood that this disclosure is merely illustrative and that such changes may be made as are fairly within the scope and spirit of the following claims.

I claim:

1. A graphic device for solving complex quantities comprising a plane flat surface having a system of rectangular cartesian coordinates marked thereon, said system of coordinates having a point of origin on the surface member; a unit circle of one unit radius marked on said surface member concentric to said point of origin; a ten circle of ten unit radius marked on said surface member concentric to said point of origin; and a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked.

2. A graphic device for solving complex quantities comprising a plane flat surface member having a system of rectangular cartesian coordinates marked thereon, said system of coordinates having a point of origin on the surface member; markings on said surface member indicating angular measurements about said point of origin; a unit circle of one unit radius marked on said surface member concentric to said point of origin; a ten circle of ten unit radius marked on said surface member concentric to said point of origin; and a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked.

3. A graphic device for solving complex quantities comprising a plane flat surface member having a system of rectangular cartesian coordinates marked thereon, said system of coordinates having a point of origin on the surface member; a unit circle of one unit radius marked on said surface member concentric to said point of origin; a ten circle of ten unit radius marked on said surface member concentric to said point of origin; a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked; and an indicator member pivoted at the point of origin of the system of coordinates and angularly movable relative to said work sheet and said surface member and having visible marking means extending in a straight line radially outward from said point of origin.

4. A graphic device for solving complex quantities comprising a plane flat surface member having a system of rectangular cartesian coordinates marked thereon, said system of coordinates having a point of origin on the surface member; markings on said surface member indicating angular measurements about said point of origin; a unit circle of one unit radius marked on said surface member concentric to said point of origin; a ten circle of ten unit radius marked on said surface member concentric to said point of origin; a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked; and an indicator member pivoted at the point of origin of the system of coordinates and angularly movable relative to said work sheet and said surface member and having visible marking means extending in a straight line radially outward from said point of origin.

5. A graphic device for solving complex quantities comprising a plane flat surface member having a system of rectangular cartesian coordinates marked thereon, said system of coordinates having a point of origin on the surface member; a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked; and a straight radial line on said transparent work sheet extending from the pivot thereof outwardly, said radial line being the only permanent marking on said work sheet.

6. An instrument for multiplying and dividing complex quantities by a graphical method comprising a bottom sheet having a plane surface marked off in a rectangular coordinate system; pivot means on said bottom sheet and coinciding with the point of origin of the coordinate system; graduations in angular measure with reference to the point of origin provided on said bottom sheet; a unit circle of one unit radius marked on said bottom sheet; a ten circle of ten units radius marked on said bottom sheet, both of said circles having the point of origin as a center and being measured from said point of origin; a transparent upper sheet pivotally mounted on the pivot at the point of origin of said coordinate system and having a surface whereon points and lines can be marked; an index mark on said upper sheet extending radially outward from the center in a straight line, said work sheet being otherwise unobstructed by permanent markings; and an arm pivotally mounted on the pivot means at the point of origin of the coordinate system and angularly movable relative to both of said sheets and having visible marking means extending in a straight line radially outward from the point of origin.

7. An instrument for multiplying and dividing complex quantities by a graphical method, comprising a bottom sheet having a plane surface marked off in a rectangular coordinate system; pivot means on said bottom sheet having an axis coinciding with the point of origin of the coordinate system; graduations in angular measure with reference to the point of origin provided on said bottom sheet; a unit circle of one unit radius marked on said bottom sheet; a ten circle of ten units radius marked on said bottom sheet, said unit circle and said ten circle both being measured from the point of origin as a center; numerals marked on said bottom sheet along the four base lines passing through the point of origin of the coordinate system to designate the units from one to ten, the numerals on the base lines above and to the right of the point of origin being marked positive and those along the base lines below and to the left of the point of origin being marked negative; a transparent upper sheet pivotally mounted on the pivot at the point of origin of said coordinate system and having a surface whereon points and lines can be marked; an index mark on said upper sheet extending radially outward from the center in a straight line, said work sheet being otherwise unobstructed by permanent markings; and an arm pivotally mounted on the pivot means at the point of origin of the coordinate system and angularly movable relative to both of said sheets and having visible marking means extending in a straight line radially outward from the point of origin.

8. A graphic device for solving complex quantities comprising a plane flat surface member having a system of rectangular cartesian coordinates marked thereon, said system of coordinates having a point of origin on the surface member; a transparent work sheet positioned over the surface member and pivoted at the point of origin of the system of coordinates and angularly movable relative to the system of coordinates and providing for complete and unobstructed visibility of the system of coordinates therethrough and having an upper surface upon which points may be marked; a straight radial line on said transparent work sheet extending from the pivot thereof outwardly; and a transparent indicator member positioned between said transparent work sheet and the surface member carrying said system of coordinates leaving the top surface of said work sheet unobstructed, said indicator member being pivoted at the point of origin of the coordinates and extending beyond the periphery of the work sheet and having visible marking means extending in a straight line radially outward from said point of origin.

EDGAR C. GOODALE.